(12) United States Patent
Park et al.

(10) Patent No.: US 8,949,714 B2
(45) Date of Patent: Feb. 3, 2015

(54) METHOD AND APPARATUS FOR TRANSMITTING AND RECEIVING AN INTEGRATED MESSAGE USING PORTABLE DEVICE

(75) Inventors: Hyun Mi Park, Seoul (KR); Tae Won Um, Seoul (KR); Seok Hyun Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 139 days.

(21) Appl. No.: 13/234,280

(22) Filed: Sep. 16, 2011

(65) Prior Publication Data

US 2012/0072856 A1    Mar. 22, 2012

(30) Foreign Application Priority Data

Sep. 20, 2010  (KR) .......................... 10-2010-0092290

(51) Int. Cl.
- *G06F 17/00*   (2006.01)
- *H04M 1/725*   (2006.01)
- *H04L 12/58*   (2006.01)

(52) U.S. Cl.
CPC ....... *H04M 1/72552* (2013.01); *H04L 12/5815* (2013.01); *H04L 12/589* (2013.01); *H04L 51/043* (2013.01); *H04L 51/36* (2013.01)
USPC .......................................................... 715/273

(58) Field of Classification Search
USPC ......................................... 715/200, 864, 273
See application file for complete search history.

(56) References Cited

U.S. PATENT DOCUMENTS

| | | | | |
|---|---|---|---|---|
| 5,559,549 A * | 9/1996 | Hendricks et al. | ............... | 725/50 |
| 5,809,230 A * | 9/1998 | Pereira | ............................. | 726/35 |
| 5,995,155 A * | 11/1999 | Schindler et al. | ............. | 348/461 |
| 6,252,588 B1 * | 6/2001 | Dawson | ........................ | 715/752 |
| 6,453,338 B1 * | 9/2002 | Shiono | ............................ | 709/206 |
| 6,833,827 B2 * | 12/2004 | Lui et al. | ........................ | 345/173 |
| 7,181,488 B2 * | 2/2007 | Martin et al. | ................. | 709/200 |
| 8,219,910 B2 * | 7/2012 | Kim | ............................. | 715/705 |
| 8,239,853 B2 * | 8/2012 | Lee | ............................... | 717/173 |
| 8,255,810 B2 * | 8/2012 | Moore et al. | ................... | 715/752 |

(Continued)

FOREIGN PATENT DOCUMENTS

| | | | | |
|---|---|---|---|---|
| EP | 1382129 B1 * | 10/2008 | | |
| KR | 10-0475613 | 3/2005 | ............... | H04Q 7/20 |

(Continued)

OTHER PUBLICATIONS

Kim, Song Kyoo; Patent Application Publication No. US 2009/0052455 A1; Publication Date: Feb. 26, 2009; "Mobile Terminal and Message Transmitting/Receiving Method for . . . ;" . . . .

*Primary Examiner* — Cong-Lac Huynh
(74) *Attorney, Agent, or Firm* — Cha + Reiter, LLC

(57) ABSTRACT

A method of sending an integrated message using a portable device according includes executing an integrated message application supporting a plurality of channels including at least two channels having different messaging schemes. An input window permits entry of a message, and the message is displayed on a message display window. In response to a user selection for displaying icons of a hidden state that corresponds to the plurality of respective channels, displaying the icons corresponding to the plurality of respective channels in response to the user choice, and sending the message using at least one activated channel of the plurality of channels.

12 Claims, 9 Drawing Sheets

(56) References Cited

U.S. PATENT DOCUMENTS

| | | | |
|---|---|---|---|
| 8,301,164 B2* | 10/2012 | Tran et al. | 455/456.1 |
| 8,307,307 B2* | 11/2012 | Wilson et al. | 715/835 |
| 2001/0035881 A1* | 11/2001 | Stoakley et al. | 345/772 |
| 2002/0052916 A1* | 5/2002 | Kloba et al. | 709/203 |
| 2002/0186261 A1* | 12/2002 | Giles et al. | 345/853 |
| 2003/0046134 A1* | 3/2003 | Frolick et al. | 705/8 |
| 2003/0064707 A1* | 4/2003 | Yoneyama | 455/412 |
| 2003/0084111 A1* | 5/2003 | Yasuta | 709/206 |
| 2004/0068545 A1* | 4/2004 | Daniell et al. | 709/206 |
| 2005/0120309 A1* | 6/2005 | Jang | 715/781 |
| 2008/0294641 A1* | 11/2008 | Kim | 707/9 |
| 2009/0094341 A1* | 4/2009 | Szeto | 709/206 |
| 2009/0094512 A1* | 4/2009 | Szeto | 715/234 |
| 2009/0177754 A1* | 7/2009 | Brezina et al. | 709/206 |
| 2009/0199007 A1* | 8/2009 | Adams et al. | 713/175 |
| 2009/0315867 A1* | 12/2009 | Sakamoto et al. | 345/184 |
| 2010/0088639 A1* | 4/2010 | Yach et al. | 715/825 |
| 2010/0137031 A1* | 6/2010 | Griffin et al. | 455/566 |
| 2010/0248788 A1* | 9/2010 | Yook et al. | 455/566 |
| 2011/0134110 A1* | 6/2011 | Song et al. | 345/419 |
| 2011/0216095 A1* | 9/2011 | Rydenhag | 345/676 |
| 2011/0230169 A1* | 9/2011 | Ohki | 455/412.1 |
| 2011/0302520 A1* | 12/2011 | Yuasa et al. | 715/773 |
| 2012/0028623 A1* | 2/2012 | Verdon | 455/418 |
| 2012/0041879 A1* | 2/2012 | Kim et al. | 705/44 |
| 2012/0087637 A1* | 4/2012 | Logan et al. | 386/241 |
| 2012/0254015 A1* | 10/2012 | Ram et al. | 705/37 |
| 2013/0086187 A1* | 4/2013 | Cohen et al. | 709/206 |
| 2013/0117691 A1* | 5/2013 | Chang et al. | 715/752 |

FOREIGN PATENT DOCUMENTS

| | | | |
|---|---|---|---|
| KR | 2007-005195 | 1/2007 | H04Q 7/20 |
| KR | 2010-0005522 | 1/2010 | H04B 1/40 |
| WO | WO 0289342 A1 * | 4/2002 | |

* cited by examiner

FIG. 3
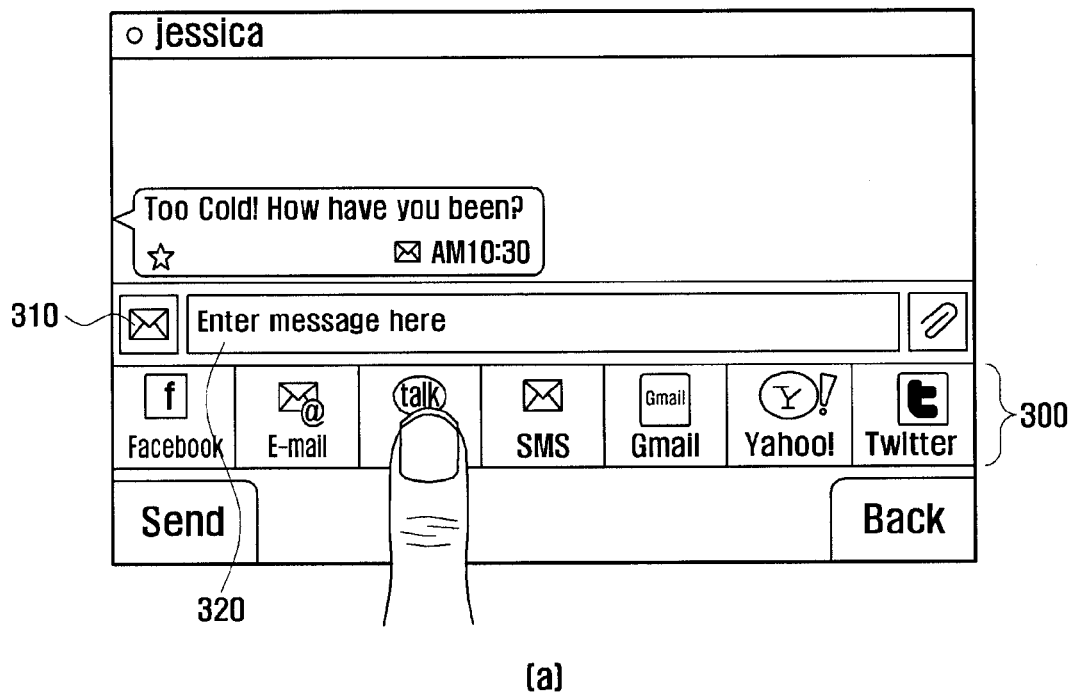
(a)
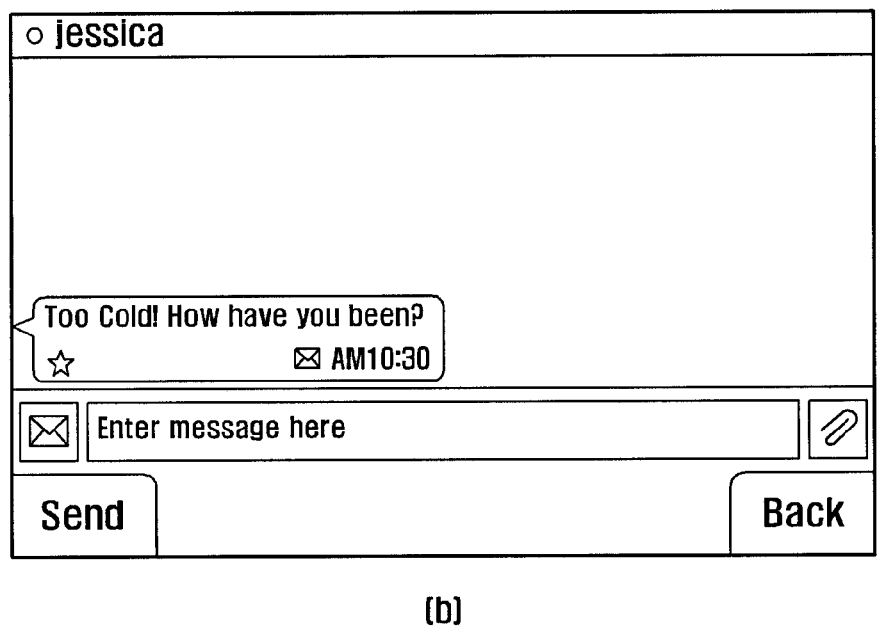
(b)

FIG. 4
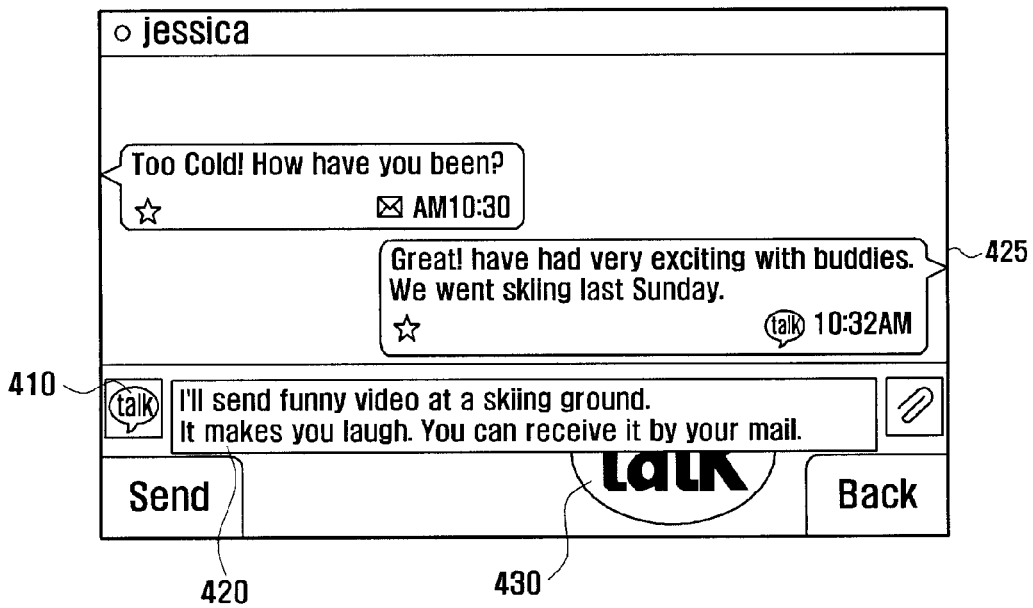
[a]
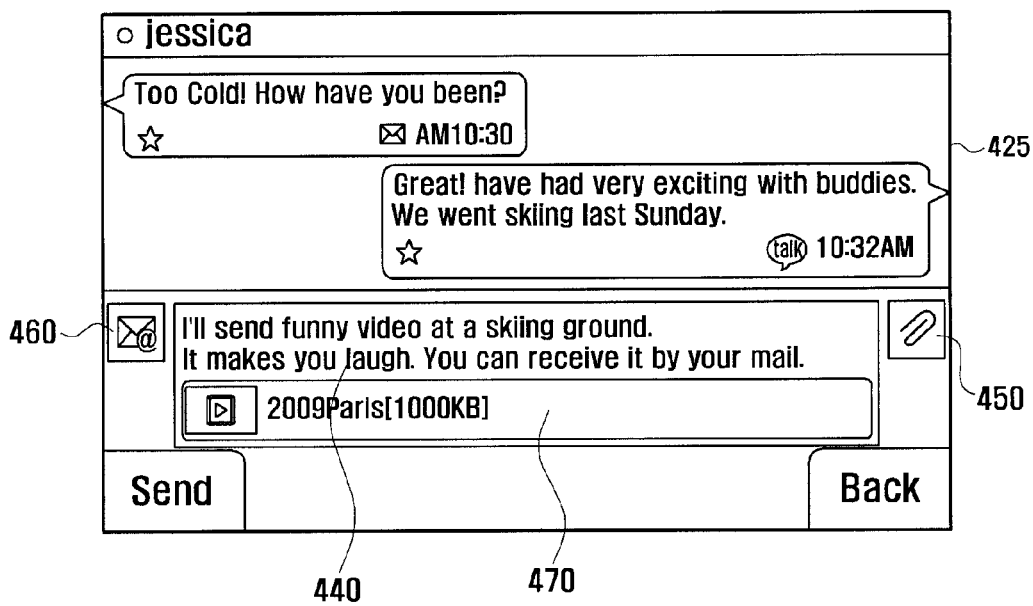
[b]

FIG. 8
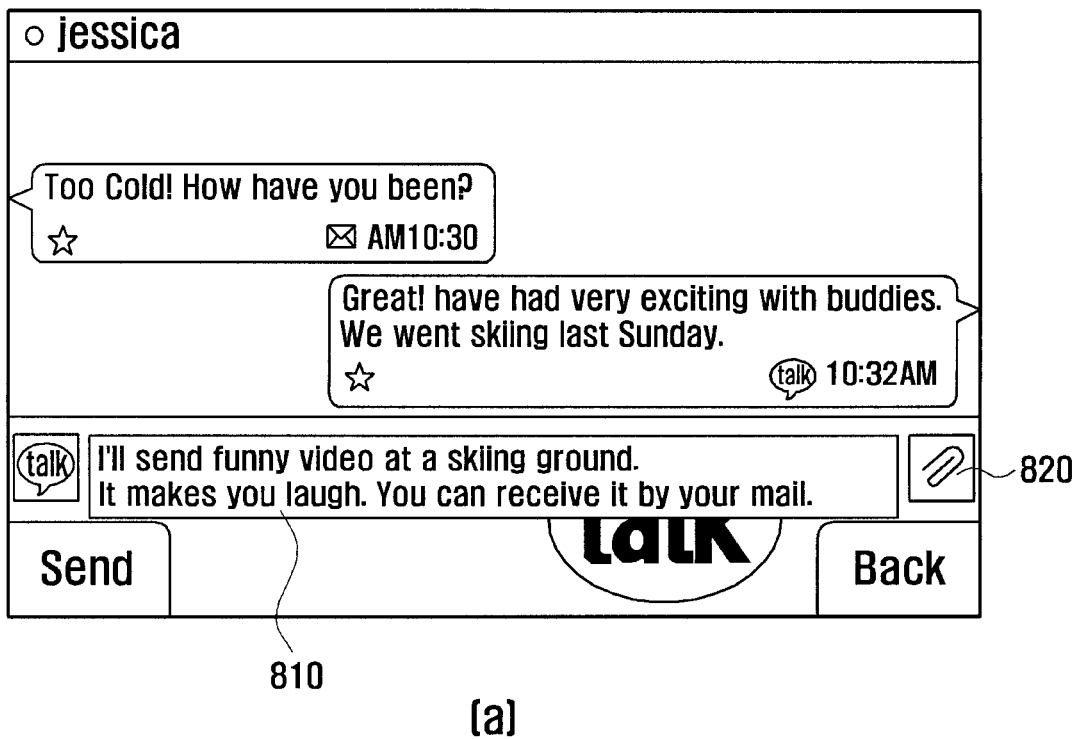
(a)
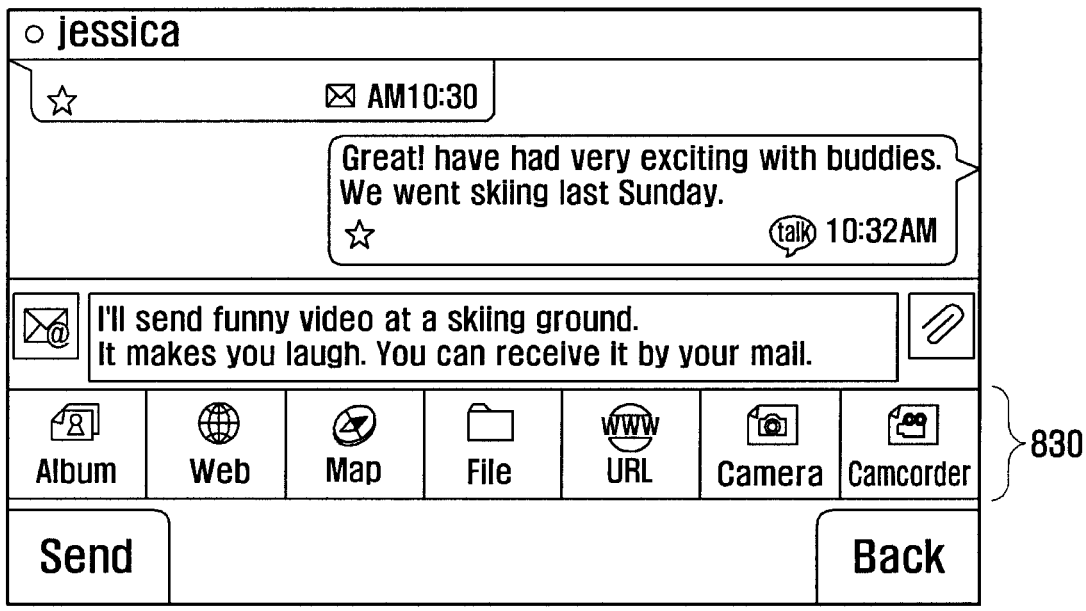
(b)

METHOD AND APPARATUS FOR TRANSMITTING AND RECEIVING AN INTEGRATED MESSAGE USING PORTABLE DEVICE

CLAIM OF PRIORITY

Applicant claims the right of priority from Korean Patent Application No. 10-2010-0092290 filed in the Korean Intellectual Property Office on Sep. 20, 2010, the contents of which are hereby incorporated by reference in its entirety.

BACKGROUND OF THE INVENTION

1. Field of the Invention

The present invention relates to a method of integrally managing various types of messages in a portable.

2. Description of the Related Art

With the development of wireless technology, portable devices are being reduced in size and weight and are their use has become widespread. With the rapid development of technology in general, a variety of supplementary functions once never considered for inclusion with a portable device have now been added to the portable device in addition to the voice call function. Such supplementary functions are quickly becoming very desirable. For example, the portable device provides a text message transmission and reception function, a photographing function, a music play function, a digital broadcasting service function, an E-mail service function, and an instant messenger service function.

A user can access a mobile communication network or perform data communication over a mobile communication network because a Code Division Multiple Access (CDMA) wireless communication module capable of accessing the mobile communication network is arranged within the portable device. In other words, a user can access Short Message Service (SMS) via a mobile communication network or access data service (e.g., sending and receiving E-mail) through the traffic channels of a mobile communication network.

Different rules are used for SMS transmitted over the mobile communication network versus E-mail service for data communication. For example, SMS uses rules regulated in a mobile communication network, and E-mail service uses a Post Office Protocol (POP)/a Simple Mail Transfer Protocol (SMTP) with a server. Since services are performed according to additional protocols such as described above, an application program for managing (e.g., writing, displaying, and sending) messages through SMS and an application program for managing messages through E-mail service independently exists in a portable device. Accordingly, the messages are managed in independent databases.

Such messages include SMS, Multimedia Message Service (MMS), E-mail, an instant message, a Social Network Service Message (SNS) and so on. The messages do not have to be compatible. Accordingly, programs (i.e., applications) supporting the formats of respective messages have to be executed, and messages have to be sent using the respective programs (i.e., applications).

When using various types of respective message applications capable of adding and sending text and files, a user writes and sends the contents using additional applications according to the types of the respective messages.

For example, SMS/MMS messages are written and sent through a message application, E-mail is written and sent through an E-mail application, an instant message is written and sent through an instant messenger, and an SNS message is written and sent through a WAP or a dedicated application.

For example, a message written through the SMS program must be written and transmitted by executing an E-mail program because the message is not transmitted in the form of E-mail. A previous message is not stored because the application program is different. Accordingly, a message must be newly written or 'Copy & Paste' function must be used.

With regard to the above paragraph, the same is true when a message is stored and a stored message is searched for. For example, in order to search for a message written through SMS and a message written through E-mail, the messages must be executed using two different application programs and searched for.

SUMMARY OF THE INVENTION

The present invention provides a method and apparatus for transmitting and receiving an integrated message using a portable device that includes a user interface for integrally displaying various types of messages in a portable device, and for writing and sending a message irrespective of the type of a message.

In accordance with an exemplary aspect of the present invention, a method of transmitting an integrated message using a portable device preferably includes: executing an integrated message application supporting a plurality of channels including at least two channels having different messaging schemes; displaying an input window for entering a message; displaying on a message display window, the message, entered in the input window; receiving a selection for displaying icons of a hidden state that correspond to the plurality of respective channels; displaying the selected icons corresponding to the plurality of respective channels in response; and sending the message using at least one activated channel of the plurality of channels.

Sending the message using at least one activated channel of the plurality of channels includes: checking a size and a type of the message entered in the input window; determining the channel of a messaging scheme that is compatible with the size and type of the message; and activating the determined channel and sending the message using the determined channel.

In accordance with an exemplary aspect of the present invention, the method of transmitting an integrated message further may include displaying a received message in the display window that has a different format from the message.

In accordance with another exemplary aspect of the present invention, the method of transmitting an integrated message further includes displaying information about at least one of a recipient who receives the message or information about a sender who sends the message.

The user choice may be performed by selecting a channel selection button. When the selection for displaying the icons that corresponds to the plurality of respective channels is received, the size of the display window may be reduced.

When one of the plurality of channels is selected, the channel selection button may be changed or replaced by an icon corresponding to the selected channel, and displayed.

After one of the plurality of channels is selected, the icons corresponding to the plurality of respective channels may be again subjected to hiding processing.

When one of the plurality of channels is selected and the channel selection button is selected, icons corresponding to displayed ones of the plurality of channels may be re-subjected to hiding processing.

The method of transmitting an integrated message may further include receiving a user choice for returning back to a preceding state.

In accordance with yet another exemplary aspect of the present invention, the method of transmitting an integrated message may further include displaying in a wallpaper an icon identical with the icon of a channel, selected from among the plurality of channels in the hidden state.

Activating at least one of the plurality of channels may preferably include sending the message using a channel through which messages have been most received.

In accordance with still another exemplary aspect of the present invention, the method of transmitting an integrated message may further include sending the message using a channel through which message have been most received after a first channel of the plurality of channels, if a failure is generated when sending the message using the first channel.

In accordance with still further another exemplary aspect of the present invention, the method of transmitting an integrated message may further include displaying in the display window an icon indicating the type of a channel selected for the message displayed.

In accordance with even another exemplary aspect of the present invention, the method of transmitting an integrated message may further include displaying an image, corresponding to the selected channel, on the channel selection button.

Channels through which the message cannot be transmitted, may be deactivated from among the plurality of channels being displayed.

In accordance with further still another exemplary aspect of the present invention, the method of transmitting an integrated message may further include selecting the channel based on a recipient who receives the message and sending the message through the selected channel.

In accordance with yet still another exemplary aspect of the present invention, the method of transmitting an integrated message may further include automatically presenting a change into another channel, when the size or type of the message is incompatible with the activated channel.

In accordance with another exemplary aspect of the present invention, the method of transmitting an integrated message may further include displaying an attachment button for attaching a file to the message or displaying a link button connected to the message.

In accordance with another exemplary aspect of the present invention, an attachment button may be displayed in the display window and in which the attachment button is capable of executing an application for attaching a file to the message.

The attachment button or a channel selection button may include an indication indicating the number of attached files.

In accordance with another exemplary aspect of the present invention, the method of transmitting an integrated message may further include displaying a thumbnail indicative of a file attached to the message.

In accordance with another exemplary aspect of the present invention, the method of transmitting an integrated message may further include displaying an option window for attaching data to the message and activating an icon corresponding to a transmittable channel when the option window is displayed.

In accordance with another aspect of the present invention, the method of transmitting an integrated message may further include presenting a change into another channel, if a capacity of the data attached to the message exceeds a reference capacity or a type of the data attached to the message is not uploaded because a type of the data is different from a type of the transmittable channel.

In accordance with an exemplary embodiment of the present invention, a method of receiving an integrated message using a portable device preferably includes displaying a received message in a display window; searching for other received messages associated with the received message; and when a file attached to the received message is selected, searching for files attached to the other received messages.

In accordance with another exemplary aspect of the present invention, the method of receiving an integrated message may further include: executing an application for executing the attached file in response to a predetermined screen touch signal; executing the attached file of the received message and displaying the executed file in the display window; when a gesture is detected in the display window in which the file is displayed, executing the files attached to the other received messages through the application and displaying the files in the display window that are attached to the other received messages; and controlling the display window so that a user can navigate between the attached file of the received message and the attached files of the other received messages through the gesture.

Searching for the files attached to the other received messages may include: searching for the files attached to the other received messages having an identical message type with the received message and searching for the files attached to the other received messages having a different message type from the received message.

In accordance with another exemplary aspect of the present invention, the method of receiving an integrated message may further include displaying the files, attached to the other received messages, in order of a time when the files are received.

In accordance with another exemplary aspect of the present invention, the method of receiving an integrated message may further include displaying a menu window to indicate a channel of the received message.

The menu window may be any one of, for example, an icon, thumbnail, content, a list, and a bar.

The gesture may be any one of, for example, a flick, a drag, a click, a tag, and a touch.

The other messages associated with the received message may include at least one of another message belonging to an identical user with the received message, another message belonging to an identical user with the received message, another message belonging to an identical sender with the received message, another message within an identical directory with the received message, and another message within an identical folder with the received message.

In accordance with another exemplary embodiment of the present invention, an apparatus for sending an integrated message using a portable device preferably includes: an integrated message application driving unit for supporting a plurality of channels including at least two channels having different messaging schemes; a display unit for displaying an input window for entering a message and displaying in the display window the message entered in the input window; and a controller for receiving a user choice for displaying icons of a hidden state, corresponding to the plurality of respective channels, displaying the icons corresponding to the plurality of respective channels in response to the user choice, and transmitting the message through an least one activated channel of the plurality of channels.

The controller may check the size and type of the message entered in the input window, determine a channel of a messaging scheme compatible with the size and type of the message, activate the determined channel, and send the message using the determined channel.

The controller may control to reduce the size of the display window, when the user choice for displaying the icons corresponding to the plurality of respective channels is received.

In accordance with another exemplary aspect of the present invention, there is provided a computer-readable recording medium on which a program is recorded comprising machine executable code for executing by a processor or microprocessor at least one of the methods.

BRIEF DESCRIPTION OF THE DRAWINGS

The above exemplary features and advantages of the present invention will become more apparent to a person of ordinary skill in the art from the following detailed description in conjunction with the accompanying drawings, in which:

FIGS. 3(a) and 3(b) are diagrams illustrating an operation for displaying channel icons corresponding to respective channels and hiding the channel icons according to an exemplary embodiment of the present invention;

FIGS. 4(a) and 4(b) are diagrams showing an example in which a selected channel is switched to another channel when a received message is incompatible with the selected channel according to an exemplary embodiment of the present invention;

FIG. 8 is a diagram showing an example in which a channel is changed into a channel to which a file can be attached when the file is attached to a message according to an exemplary embodiment of the present invention.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring appreciation of the subject matter of the present invention by a person of ordinary skill in the art with such well-known structures and functions.

Figure 1:
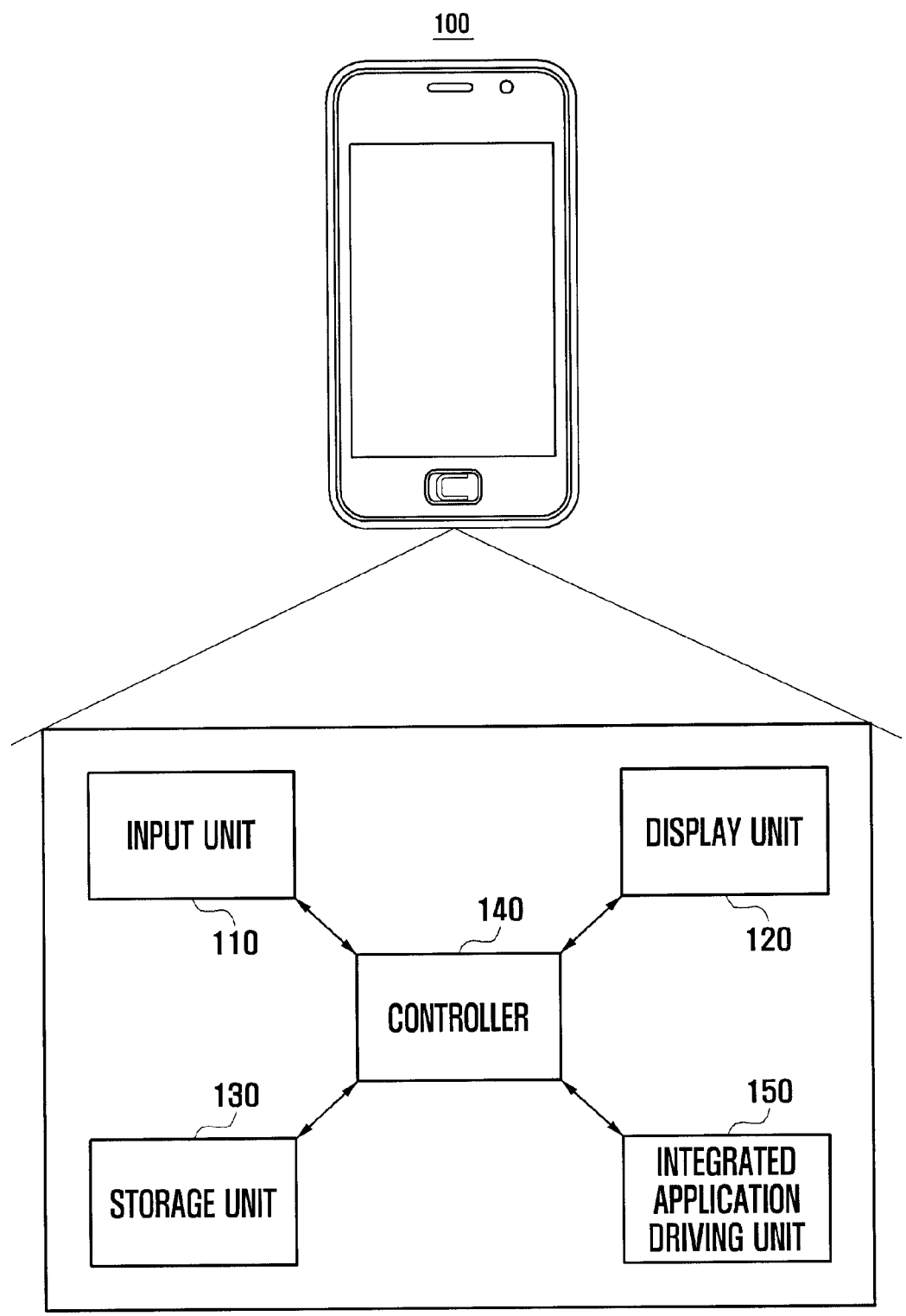
FIG. 1 is a block diagram of an integrated message transmission and reception apparatus configured in a portable device according to an exemplary embodiment of the present invention.

FIG. 1 is a block diagram of an integrated message transmission and reception apparatus configured in a portable device according to an exemplary embodiment of the present invention.

Referring now to FIG. 1, the portable device 100 may preferably include an input unit 110, a display unit 120, a storage unit 130, a controller 140, and an integrated application driving unit 150.

The input unit 110 can receive various pieces of number or character information from a user. Furthermore, the input unit 110 may include various keys for setting functions, input keys for controlling the functions of the portable device 100, function keys and the like. For example, the input unit 110 may include a call key for requesting a voice call, a video call key for requesting a video call, an end key for requesting the end of a voice call or a video call, a volume key for adjusting the volume of the output of an audio signal, etc.

The input unit 110 may be formed of any one of input devices, such as a touch pad, a touch screen, a button type keypad of a common key arrangement form, and a button type keypad of a QWERTY format, a DVORAK format, or any alphanumeric combination according to a form provided by the portable device 100. If the input unit 110 comprises touch screen, the input unit 110 may display a keypad for entering keys on a screen. It is also possible the touchscreen and display screen may comprise portions of a common display.

The display unit 120 preferably displays an input window for entering a message and displays a message, entered in the input window, on a display window. Furthermore, the display unit 120 may display inputted user data, function configuration information, and various other pieces of information provided to a user as well as various menu screens provided by the portable device 100. For example, the display unit 120 may output a booting screen, a standby screen, menu screens, and a video call screen. The display unit 120 can output a user interface for operating an integrated message.

The display unit 120 may be formed of a Liquid Crystal Display (LCD), Organic Light Emitting Diodes (OLED), Active Matrix Organic Light Emitting Diodes (AMOLED) or the like. Furthermore, the display unit 120 may be formed in a touch screen form.

The storage unit 130 can store an Operating System (OS) of the portable device 100, an integrated message OS, application programs for other optional functions (e.g., a sound play function, an image or video play function, and a broadcasting play function), user data, and messages and data which are transmitted and received when a call is performed.

The controller 140, which is typically a microprocessor, can operate to control the functions of the elements of the portable device 100. For example, the controller 140 may control an integrated message management application, the entire operation of the portable device 100, and the flow of signals between the internal blocks of the portable device 100. The controller 140 may have the function of a data processing unit for processing messages or data or both which are transmitted and received through a wireless communication unit (not shown). Of course, the controller coordinates and controls operation of all of the units 110, 120, 130, 140, 150. A person of ordinary skill in the art should understand and appreciate that the units shown in FIG. 1 can be combinable or possibly further separated or subdivided (e.g. storage unit 130).

With continued reference to FIG. 1, the integrated application driving unit 150 preferably executes an integrated message application which supports a plurality of channels including at least two channels having respectively different messaging schemes. The messaging scheme is a scheme for transmitting a message, and the scheme may include, for example, SMS, Multimedia Message Service (MMS), E-mail, instant messaging, or a Social Network Service (SNS). Furthermore, the messaging scheme may vary according to a service supplier that provides messaging service or the manufacturer or supplier of an application program for message transmission. For example, in case of E-mail, there is E-mail provided by Google© and E-mail provided by Yahoo©. Even in such a case, relevant messaging schemes may be interpreted as different channels. In case of messaging applications operated in smart phones, a messaging application provided by a company A and a messaging application provided by a company B may be interpreted as the channels of different messaging schemes.

The integrated message application, as described above, can integrally support a plurality of channels including at least two channels having different messaging schemes. The integrated message application driving unit 150 preferably integrally controls the channels of different messaging schemes. Furthermore, the integrated application driving unit 150 can integrally operate messages of different forms although a user selects a messaging scheme and a recipient according to the character and intention of a message.

A wireless communication unit (not shown) may be included in the portable device 100. The wireless communication unit is a device for transmitting and receiving radio signals over a mobile communication network. The wireless communication unit may include a transceiver, a transmission and reception separator for separating transmission and reception signals from each other, a Radio Frequency (RF) transmitter for performing up-conversion and amplification for the frequency of a transmission signal, and an RF receiver for performing low-noise amplification for a received signal and performing down-conversion for the frequency of the received signal. The wireless communication unit may send a message by using at least one activated channel of the plurality of channels which are supported by the portable device 100.

Although not shown, the portable device 100 may further selectively include elements having supplementary functions, such as a camera unit for photographing an image or video, a near field communication unit for near field radio communication, a broadcasting reception unit for receiving broadcasting data, a digital sound source play unit, such as an MP3 module, a visual light communication (VLC) unit and an Internet communication module for performing an Internet function. There can be various combinations and modifications of such units according to the convergence trend of digital devices, but the portable device 100 of the present invention may further include some or all of the elements and equivalents thereof.

The transmission and reception of a message according to an exemplary embodiment of the present invention includes a transmission device and a reception device. The portable device 100 shown in FIG. 1 may play the role of the transmission device or the reception device. The transmission device can be considered to be a first portable device when the user of the first portable device sends a message to a second portable device. The reception device can be considered to be a second portable device when the user of a first portable device sends a message to the second portable device. Both the first portable device and the second portable device perform transmission and reception, and thus transmission and reception may be exchanged between the two portable devices.

A message (e.g., an SMS message, an MMS message, an E-mail message, or an HTML message) written using the integrated message program embedded in a transmission device is transmitted to a reception device over a communication network. For example, as described above in connection with the integrated application driving unit 150, the integrated message program can integrate and manage various types of messages which are transmitted and received through transmission and reception devices and can write and send a message irrespective of the type of a message. The reception device receives a message from the transmission device through the integrated message program. The message may be converted, stored, and/or managed in the form of the integrated message program. Furthermore, the message may be stored and/or managed in the form of at least one of an SMS message, an MMS message, an E-mail message, and HTML message. The first portable device and the second portable device support both functions of sending and receiving a message, and a portable device is described as an example.

Figure 2:
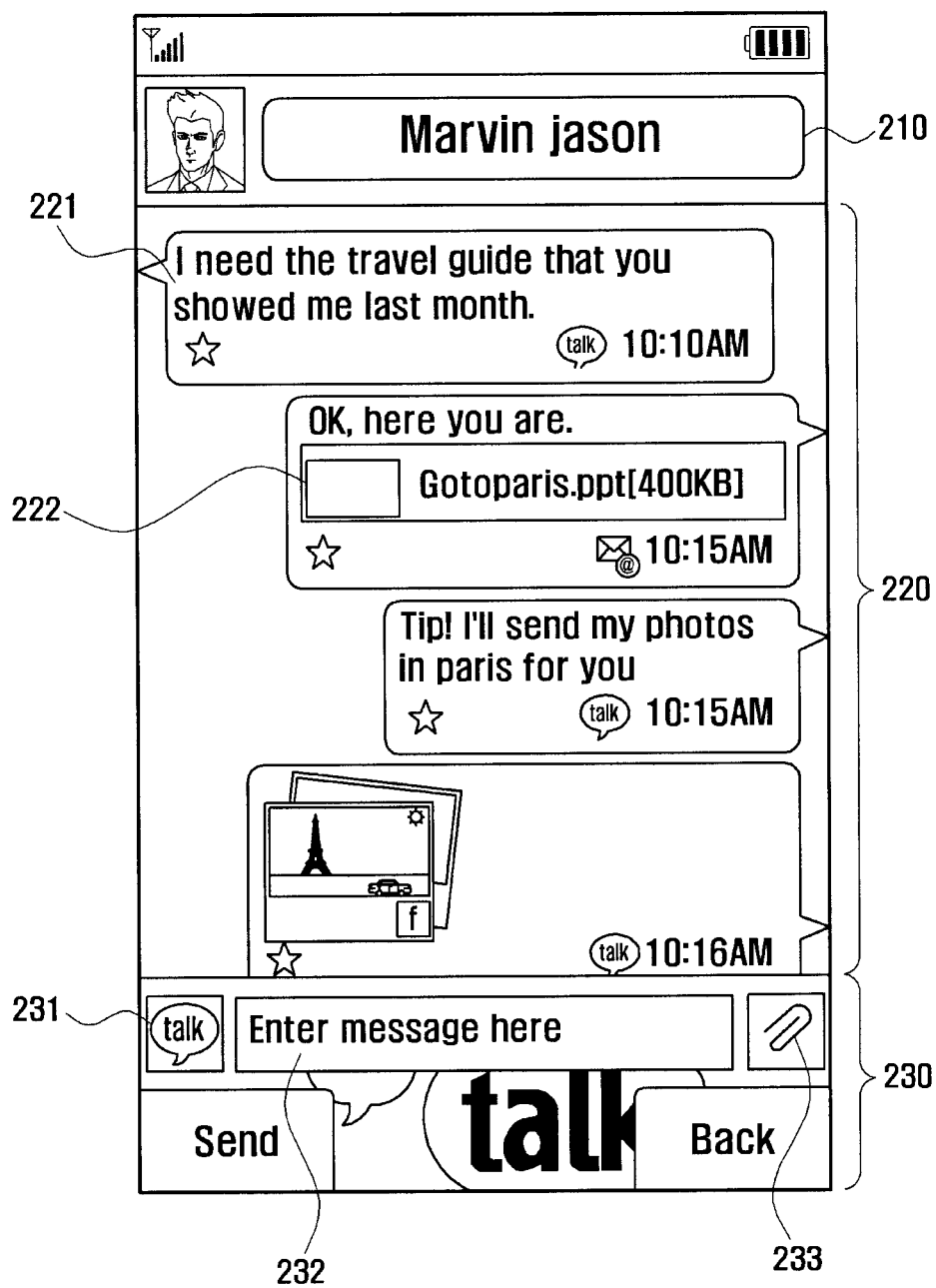
FIG. 2 is a diagram showing an example of a user interface for the transmission and reception of an integrated message according to an exemplary embodiment of the present invention.

FIG. 2 is a diagram showing an example of a user interface for the transmission and reception of an integrated message according to an exemplary embodiment.

Referring now to FIG. 2, the user interface 200 preferably includes a user information window 210, a message display window 220, and an integrated message editor 230.

The user information window 210 can display information about a recipient who receives a message or information about a sender who sends a message, or about both the sender and the recipient. The user information window 210 may be implemented in various ways. For example, the user information window 210 may display information about a recipient who receives a message transmitted by a user who uses a portable device. Furthermore, the user information window 210 may display information identifying a recipient who receives a message displayed in the message display window 220 or information about a sender who sends a message displayed in the message display window 220. According to another example, the user information window 210 may display information about a user who operates a portable device. In this case, "Marvin Jason" is the user (owner/operator) of the portable device which displays the user interface 200. According to yet another example, the user information window 210 may display information about the counterpart of a message displayed in the message display window 220. For example, if messages transmitted and received between the user of a portable device displaying the user interface 200 and a counterpart named "Marvin Jason" are displayed in the message display window 220, the user information window 210 may display the counterpart named "Marvin Jason".

In accordance with another exemplary embodiment, the message display window 220 may display messages transmitted to and received from a plurality of counterparts. In this case, the user information window 210 displays the user (operator/owner) of the portable device by default. When the user selects one of messages displayed in the message display window 220, the user information window 210 displays the counterpart of the selected message. For example, if the counterpart of a message 221 is "Marvin Jason" and the counterpart of a message 222 is "Julie Kim", when a user selects the message 221, the user information window 210 displays "Marvin Jason". Furthermore, when the user selects the message 222, the user information window 210 displays "Julie Kim".

In order to display information in the user information window 210 about a recipient who receives a message or information about a sender who sends a message, or about both a sender and a recipient, the storage unit 130 of FIG. 1 may store information about the sender of the message or information about the recipient of the message, or both the sender and the recipient, based on the respective messages. Accordingly, the controller 140 can identify information about the sender of a message or the recipient of a message or both which are displayed in the message display window 220 with reference to the storage unit 130 and can display the information in the user information window 210.

The message display window 220 can display the received message 221, or the transmitted message 222, or may display both the transmitted and received messages 221, 222. For example, when a user sends a message to the user of another portable device using his portable device, the transmitted message 222 can be displayed in the message display window 220. Furthermore, when the user of another portable device sends a message to the portable device 100, the message 221 received by the portable device can be displayed in the message display window 220. If the portable device sends a message in response to the received message 221, the transmitted message 222 can also be displayed in the message display window 220 in response thereto.

The received message 221 and the transmitted message 222 displayed in the message display window 220 may be messages transmitted according to the same messaging scheme or may be messages transmitted according to different messaging schemes. For example, in response to the message 221 received from another user, a user may send a message to another user using the same messaging scheme as the received message 221. In this case, the user may make a reply to the message without changing a messaging scheme.

Furthermore, when the user sends a message to another user, the portable terminal may use a different messaging scheme from that of the message 221 received from another user. In this case, the user may determine a messaging scheme used to send a message by taking the form of the messaging scheme, convenience, etc. into account, change the messaging scheme, and send the message.

The integrated message editor 230 may preferably include, for example, a channel selection button 231, an input window 232, an attachment button 233, and channel icons (not shown). A person or ordinary skill in the art understands and appreciates that the order of these items may also be different than shown in FIG. 2.

The integrated message editor 230 may include channel icons for a plurality of respective channels, including at least two channels having different messaging schemes, in a hidden form.

Referring now to FIG. 3(*a*), channel icons 300 for a plurality of respective channels are displayed on the integrated message editor. For example, if the messaging scheme of a message is not changed (i.e., if a message is sent using the same messaging scheme as that of a received message), channel icons for a plurality of respective channels may not be displayed on the integrated message editor 230.

The channel selection button 231 (shown in FIG. 2) is a button for displaying channel icons of a hidden form. When a user selects the channel selection button 231, the controller 140 of FIG. 1 displays the channel icons of a hidden form on the integrated message editor 230. The user selects the channel selection button 231 in order to change or select the messaging scheme of a written message. Accordingly, as shown in FIG. 3(*a*), the channel icons 300 corresponding to respective channels are displayed on the integrated message editor 230. The user can change the messaging scheme of the written message to be sent by selecting one of the displayed channel icons 300.

The input window 232 comprises a window for displaying a message that is being entered. As shown in FIG. 2, the input window 232 may be displayed on the integrated message editor 230. A user may input a message to the input window 232 by using a keypad, such as via a keyboard (not shown) included in a portable device or a digital keyboard (not shown) displayed on the user interface 200.

The attachment button 233 is a button (or touch activated area) for attaching file (e.g., photos and audio files) to a message. A user can select a file to be attached to a message which is being written in the input window 232 by selecting the attachment button 233 displayed on the integrated message editor 230.

The user interface 200 may include a send button ("Send") for sending a message that has been entered in the input window 232 or a back button ("Back") for returning the state of the user interface 200 of an integrated message to a preceding state or both on, for example, the integrated message editor 230. When a user selects the back button, the portable device returns the state of the user interface 200 back to a preceding state. To this end, the portable device may always store the preceding state of the user interface 200, and may store a sequence of preceding states of the user interface 200.

In FIG. 2, the channel selection button 231, the input window 232, the attachment button 233, the channel icons (not shown), the send button, and the back button are illustrated for display on the integrated message editor, but may be displayed in other areas of the display according to need or desire. The same is true of all displayed objects described herein, as the arrangement is preferable.

An example of a method of managing messages using the integrated message management application between channels having different messaging schemes will now be described herein below. If a Wi-Fi network is connected, an SMS message may be changed into an instant messenger and then transmitted because an instant messenger using the Wi-Fi network is in an on-line state. Furthermore, if an SNS account (e.g., Facebook) exists, the SMS message may be changed into a message form of an SNS messenger using an internal messenger provided by the Social Network Service (SNS) and then transmitted.

FIG. 3 is a diagram illustrating an operation for displaying channel icons corresponding to respective channels and hiding the channel icons according to an exemplary embodiment of the present invention. FIG. 3(*a*) is a diagram showing an example in which channel icons 300 corresponding to a plurality of respective channels are displayed on the screen of the portable device 200 when the channel selection button 310 is selected. FIG. 3(*b*) is a diagram showing an example in which the plurality of channels is hidden on the screen of the portable device 200 when the channel selection button 310 is selected.

Referring now to FIG. 3(*b*), the channel icons corresponding to the plurality of respective channels, including at least two channels having different messaging schemes, are hidden on the integrated message editor 230 (FIG. 2). Here, when a user inputs a message to the input window 232, 320 and selects the channel selection button 231, 310 in order to change or select or both a messaging scheme, the channel icons 300 corresponding to the plurality of respective hidden channels are displayed as shown in FIG. 3(*a*).

In detail, the controller 140 of FIG. 1 can receive a user choice of displaying the channel icons of a hidden state, corresponding to the plurality of respective channels, from a user through the channel selection button 231, 310. When the controller 140 receives the user's selection for displaying the channel icons of a hidden state, corresponding to the plurality of respective channels, through the channel selection button 231, 310, the controller 140 can display the channel icons 300, corresponding to the plurality of respective channels, on the integrated message editor in response to the selection.

Here, the controller 140 may not display all of the channel icons 300 corresponding to all messaging schemes supported by the portable device, but display only some of the channel icons, such as the most popular, or user-selected. For example, the controller 140 may maintain information about channels that have recently been most used by a user for a certain period, identify channel icons corresponding to N channels according to frequency of use, and display the identified channel icons with the highest frequency of use for the particular portable device. For another example, the controller 140 may select N channels on the basis of information about channels used by messages that have most recently been transmitted or received, from among messages displayed on the message display window 220, and display channel icons corresponding to the selected channels.

A user can send a message written using the input window 320 by selecting one of the plurality of displayed channel icons 300 and pressing the send button. When the user selects the send button, the message displayed on the input window 320 is sent to a counterpart according to the messaging scheme of the selected channel. Thus, a message can be sent choosing, for example, Facebook, Gmail, Twitter, or Yahoo. It is also within the scope of the invention that the message displayed could be sent to more than one counterpart by selecting more than one icon 300.

A plurality of channels preferably includes channels formed according to different messaging schemes. Furthermore, the plurality of channels may include channels owned by a recipient (i.e. another user). The selected channel may be activated and displayed so that it is distinguished from other unselected channels. Furthermore, channels incompatible with the channels owned by the recipient, from among the plurality of channels, may be deactivated so that time and effort is not wasted sending a message using a message scheme which is not compatible with a recipient (e.g. the recipient does not have a G-mail account). When the user sends a message, the user may select the channel(s) on the basis of the channels owned by the recipient who receives the message and send the message according to the selected channel.

In accordance with another exemplary embodiment of the present invention, the portable device may select a channel on the basis of a recipient who will receive a message written by a user and send the written message according to the selected channel. For example, the portable device may maintain information about a channel that is frequently used on the basis of a counterpart and select the channel that is chiefly used for communication with a recipient who receives a message according to the recipient as a transmission channel.

The activation method may preferably include, for example, at least one of distinguishing the color of an icon, a distinguishing the brightness of an icon, distinguishing the size of an icon (e.g. to become large, or to make the other icons smaller), a method of making different a font existing within an icon, and a method of increasing a font existing within an icon.

The controller 140 receives a user selection for displaying the channel icons of a hidden state, corresponding to the plurality of respective channels, displays the channel icons corresponding to the plurality of respective channels in response to the user selection, and controls the transmission of a message according to at least one activated channel of the plurality of channels.

Information about the selected channel, information about the compatible channels, or information about incompatible channels may be stored in the storage unit 130.

When a user selects the channel selection button 310 in FIG. 3(a), the user interface may be displayed, such as that shown in FIG. 3(b). That is, when the channel selection button 310 is selected with the plurality of channel icons 300 being displayed, the plurality of channel icons 300 may be hidden on the screen of the portable device.

A method of sending a message according to an example of an exemplary embodiment will now be described herein below.

A user executes the integrated message application supporting the plurality of channels including at least two channels having different messaging schemes. Furthermore, the user inputs a message via a keypad to the input window 320 displayed on the screen of the portable device. The message entered in the input window 320 is displayed on the message display window 220 of the portable device. In order to change a messaging scheme, the user selects the channel selection button 310. Accordingly, channel icons 300 of a hidden state, corresponding to the plurality of respective channels, are then displayed on the screen of the portable device. The user selects one of the plurality of channels and sends the message using the selected channel.

The integrated application driving unit 150 checks the size and type of the message entered in the input window 320 and may determine the channel of a messaging scheme which complies with the size and type of the message to be sent. Furthermore, the integrated application driving unit 150 activates the determined channel and controls the portable device 100 so that the message can be transmitted through the determined channel.

Referring now to FIG. 3(b), if one of the plurality of channels is selected, the channel icons 300 corresponding to all or to a remainder of the plurality of respective channels may be automatically hidden from display. In order to change the channel, a user may select the channel selection button 310 so that the hidden channel icons 300 corresponding to the plurality of respective channels are displayed again. Accordingly, the user can select another channel by selecting one of the channel icons 300 corresponding to the plurality of respective channels. Furthermore, when the channel selection button 310 is selected again, the channel icons 300 corresponding to the plurality of respective channels can again be hidden from view.

The controller 140 of FIG. 1 can control the hiding processing function of the channel icons 300 corresponding to the plurality of respective channels.

If the channel selection button for displaying the channel icons 300 corresponding to the plurality of respective channels is selected, the size of the message display window 220 may be reduced while the channel icon 300 for the plurality of channels appear on the screen of the portable device 100. The user choice of displaying the channel icons 300 of a hidden state corresponding to the plurality of respective channel may be performed by selecting the channel selection button 310. If a user choice of displaying the channel icons corresponding to the plurality of respective channels is received, the size of the message display window may be reduced that much and displayed. Furthermore, if one of the plurality of channels is selected and the channel selection button is selected, the channel icons corresponding to the plurality of respective displayed channels may be again hidden from view.

If one of the plurality of channels is selected, the channel selection button 310 may be changed into an icon corresponding to the selected channel and displayed. In FIG. 3, the channel selection button 310 is changed into an icon corresponding to a now selected channel and displayed. A user who uses an integrated message can easily check the now selected channel based on the icon of the channel selection button 310, and the change of the icon may be controlled by the controller 140.

After one of the plurality of channels is selected, the icons corresponding to the plurality of channels may be subjected to hiding process again (i.e. hidden from view).

If a user does not select a channel, a channel through which messages have been most received may be selected by the portable device by default. The channel selected by default from among the plurality of channels, may be activated and displayed. To this end, the portable device may maintain the number of transmitted messages or the number of received messages or both according to each channel for a certain period.

If a failure is generated when a message is sent to a first channel of the plurality of channels, the portable device may send the message through another channel through which the most messages have been received after the first channel. The portable device maintains the number of transmitted messages or the number of received messages or both according to each channel for a certain period and thus can identify a channel through which messages have been most received after the first channel on the basis of the information.

When a user selection of displaying the channel icons corresponding to the plurality of respective channels is received, the controller 140 may control to reduce the size of the message display window.

An image indicating the type of a selected channel may be displayed on the transmitted message 222 displayed on the message display window 220. Images, indicating the transmission channels of the transmitted messages 221, 222, are displayed before the times when the messages are transmitted or received or both in the messages displayed in FIG. 2.

Furthermore, an image corresponding to the selected channel may be displayed on the channel selection button 310.

FIG. 4 is a diagram showing an example in which a selected channel is switched to another channel when a received message is incompatible with the selected channel according to another exemplary embodiment of the present invention.

Referring now to FIG. 4(*a*), if the size and type of a message entered in an input window 420 are incompatible with an activated channel, the portable device may automatically present a change into another channel to a user. For example, if the size and type of a message entered in the input window 420 are incompatible with a selected channel, a sentence to automatically present a change into another compatible channel may be displayed on the message display window 425.

A user may determine whether or not to change to another channel or a specific channel according to the sentence displayed. Furthermore, if the size and type of a message entered in the input window 420 is incompatible with the selected channel, the existing channel may be automatically changed into another channel compatible with the size and type of the entered message. The automatically changed channel may be a channel through which messages have been most received or may be a channel randomly selected by a user.

If the existing channel is changed to another channel so that a user can recognize the changed channel, an image or an icon indicating the changed channel may be displayed on a channel selection button 460 or on a message displayed on the message display window 425. The same icon as the icon of a channel, selected from among a plurality of channels of a hidden state, may be displayed on a wallpaper 430 so that a user can recognize the type of the selected channel.

The controller 140 (of FIG. 1) checks the size and type of the message entered in the input window 220, 425, determines the channel of a messaging scheme compatible with the size and type of the message, activates the determined channel, and controls to send the message through the determined channel. The storage unit 130 may store information about the most suitable channel according to the size of the message or the type of the message or both. The controller 140 may determine a channel suitable for the message with reference to the storage unit 130 on the basis of the size of the message or the type of the message or both the size and type of the message. Furthermore, the suitable channel may be differently determined according to a current communication environment. For example, if a current communication environment is a free Wi-Fi environment, a transmission channel may be selected from among channels using Wi-Fi. A process of activating at least one of a plurality of channels may include a process of sending the message through a channel through which most of the messages have been received. Furthermore, if a failure is generated when the message is transmitted through a first channel of the plurality of channels, the message may be transmitted through a channel through which a second-most quantity of messages have been received after the first channel.

An attachment button 450 to execute an application for attaching files to a message entered in the input window 440 may be displayed or a link button (not shown) connected to the files attached to the message may be displayed.

The attachment button 450, a message, or an indication, indicating that there is a file attached to the message, may be displayed on the channel selection button 460. For example, if an attached file exists in the message, at least one of a sentence, an image, and an icon indicating the attachment may be displayed on the attachment button 450 or the channel selection button 460. Furthermore, an indication indicative of the number of files attached to the message may be displayed on the attachment button 450, the message, or the channel selection button 460. The indication may include at least one of an Arabic number, a Romaic number, or an alpha-numeric character and thumbnail which indicate the number of attached files.

If the attachment button 450 is selected, the controller 140 may control to display an option window for attaching files to the message. When the option window is displayed, the controller 140 may control to activate an icon corresponding to a channel through which the message can be transmitted. When the option window is displayed, the icon corresponding to the channel through which the message can be transmitted may be activated.

If a file is attached to the message, an icon 470 indicative of the attached file may be displayed. The icon 470 may be displayed in a thumbnail form or a specific image form. A test sentence or the capacity of the file through which the attached file can be known may be displayed on the icon 470.

If the capacity of data attached to the message exceeds a reference capacity or the type of data to be attached to the message is not uploaded because it is different from the type of the transmittable channel, the controller 140 may change to another channel, or display a message instructing the user to select another channel, or may ask the user to confirm selection of a another channel selected by the portable device.

Figure 5:
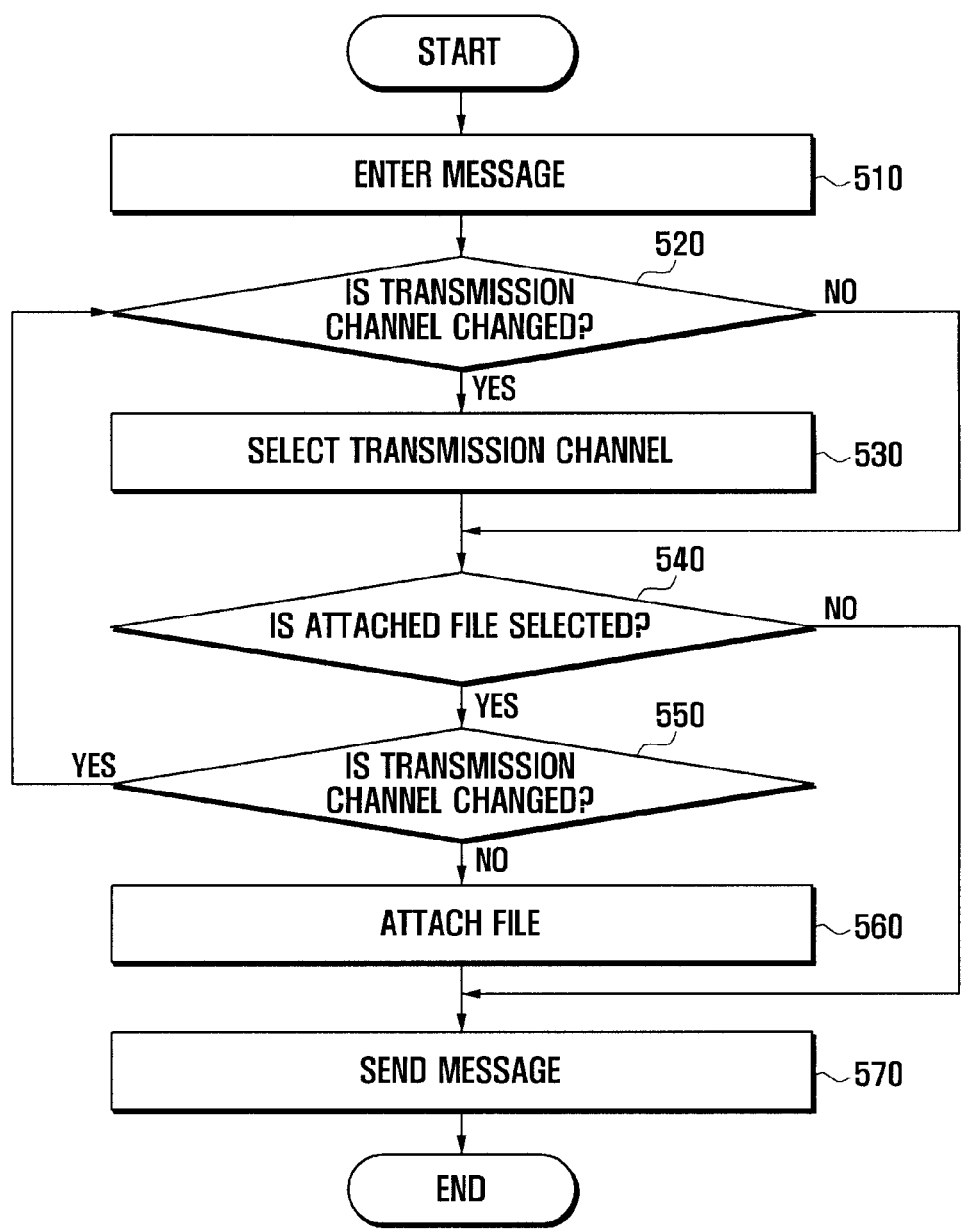
FIG. 5 is a flowchart illustrating exemplary operation of a method of transmitting an integrated message according to an exemplary embodiment of the present invention.

FIG. 5 is a flowchart illustrating a method of transmitting an integrated message according to an exemplary embodiment of the present invention.

The integrated application driving unit 150 of FIG. 1 drives the integrated message application. The contents displayed in the portable device when the integrated message application is driven have been described with reference to FIGS. 2 to 4.

The display unit 120 of FIG. 1 displays the input window for entering a message.

At step (510), a user inputs a message using the input window. The message could be marked with a stylus or entered via a keypad.

At step (520), the controller 140 of FIG. 1 checks whether the user has changed a transmission channel. For example, the controller 140 may select one of a plurality of channel icons displayed when the user selects the channel selection button 231 and check whether a transmission channel different from a message transmission channel now being used has been selected.

If, as a result of the check at step (520), the user has not changed the transmission channel, the process proceeds to step (540).

For example, if the user does not change the existing selected channel at (520) and sends a message through the existing selected channel, the user may input the message to the input window and then send the written message through the existing selected channel by selecting the send button. According to exemplary embodiments of the present invention, the existing selected channel may be a channel that has been most recently used in communication with a counterpart to which a user will send a message. According to the exemplary embodiments of the present invention, the existing selected channel may be a channel that has been previously set by a user. The existing selected channel may also be a channel that has been most recently used by a user for a certain period. The existing selected channel may be a channel that has previously been set by a user according to a counterpart.

If, as a result of the check at step (520), the user has changed the transmission channel, then at (530) the changed transmission channel through the message is sent is selected. For example, the user may select the channel selection button 231 of FIG. 2 so that channel icons 300 corresponding to a plurality of channels, including at least two channels having different messaging schemes, are displayed (referring to FIG. 3). The channel icons corresponding to the plurality of respective channels, including at least two channels having different messaging schemes, are in a hidden state and displayed on the portable device when the user selects the channel selection button 231. Next, the user may select a transmission channel through which the message is sent by selecting one of the displayed channel icons 300.

At (540), the controller, 140 of FIG. 1 checks whether the user has requested to attach a file to the message. For example, the controller 140 may check whether the user has requested to attach a file to the message by checking whether the user has selected the attachment button 450 of FIG. 4. If the user attaches a file to the message, the user selects the attachment button 450 and executes an application for attaching the file to the message so that the application is displayed on the option window. The user may attach the file to the message according to an instruction displayed in the option window and send the message to which the file has been attached using the selected channel.

If the type of the file to be attached is incompatible with the type of the message, then at (550) the user may change the existing channel into another channel compatible with the type of the file. In this case, process returns back to step (520).

The portable device may attach the file to the message using the changed channel (560) and send the message to which the file has been attached using the changed channel (570).

As described above, a message is written in one integrated message editor and then sent. Accordingly, various types of messages can be written and transmitted through one message application without the need to drive various types of message applications. Furthermore, since one message application is operated as an integrated inbox, a message history can be checked on one screen. Furthermore, a user can change a channel according to the type of a message to be sent.

The integrated message editor can select a channel according to a message written by a user and a file attached to the message. Accordingly, a user has only to determine a recipient and does not need to worry about what message application is used. Accordingly, convenience in terms of management can be increased.

Figure 6:
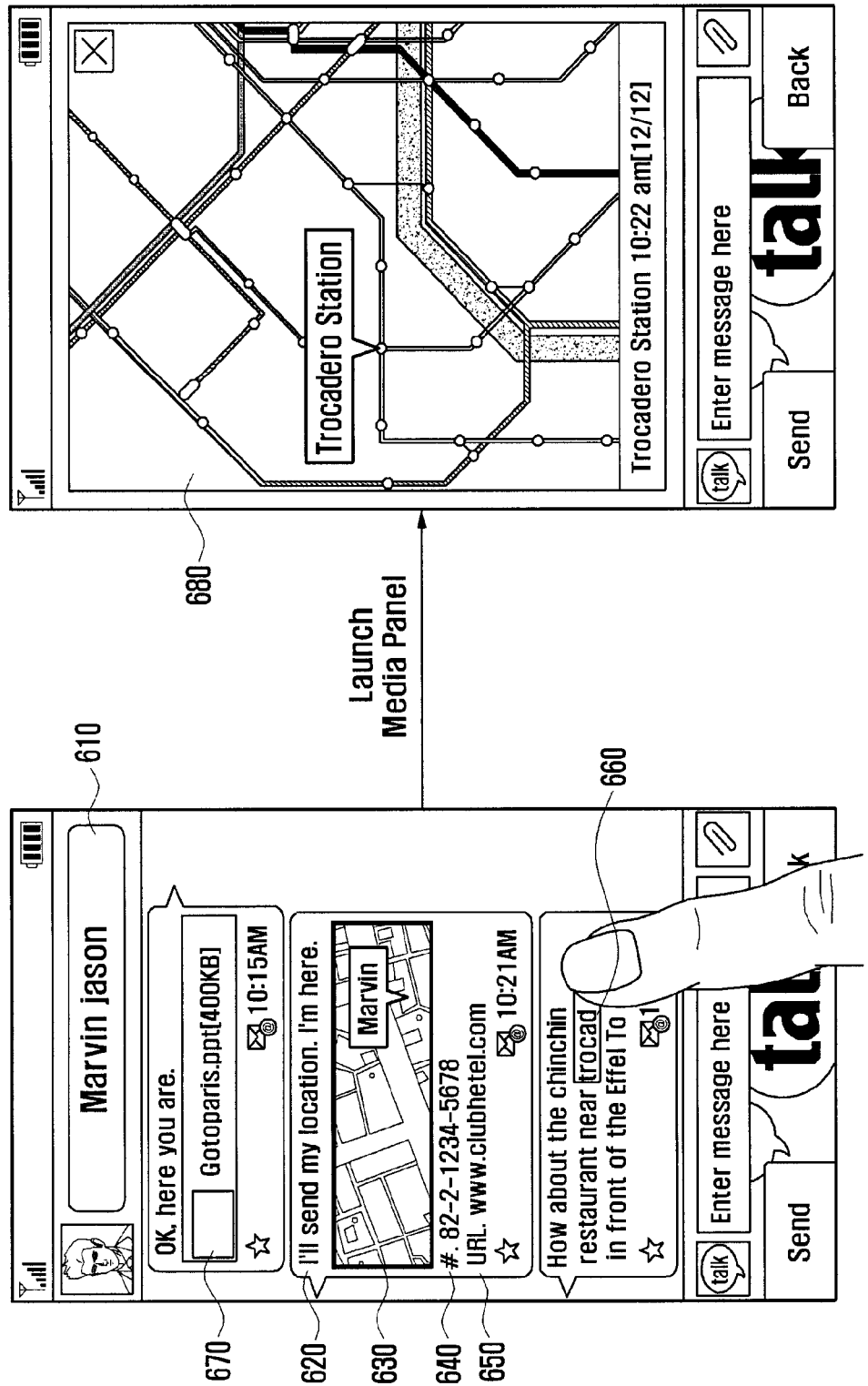
FIG. 6 is a diagram showing an example in which a file attached to a received message is selected and executed according to an exemplary embodiment of the present invention.

FIG. 6 is a diagram showing an example in which a file attached to a received message is selected and executed according to an exemplary embodiment of the present invention.

Referring now to FIG. 6, a portable device screen 600 displays recipient information 610 or a received message 620.

The recipient information 610 may indicate recipient information about a message received as an integrated message. According to an exemplary embodiment of the present invention, the recipient information 610 may indicate information about a user who has sent a message to the portable device 100. In this case, the recipient information 610 may display information about the counterpart of messages which are displayed in the portable device screen 600. For example, messages communicated between the user of the portable device 100, displaying the portable device screen 600, and a counterpart "Marvin Jason" may be displayed in the portable device screen 600. That is, when the user of the portable device 100 selects a recipient or responds to a received message, information about the recipient may be displayed in the portable device screen 600.

The received message 620 may be a message transmitted from the user (i.e., a recipient) of another portable device to the user of the portable device 100 using an integrated message OS. For example, if the user of another portable device sends the message to the portable device 100, the received message 620 received by the portable device 100 may be displayed in the portable device screen 600.

At least one of thumbnail 630, a phone number 640, a URL address link 650, a text link 660, and an icon 670 indicative of an attached file may be included in the message 620. The thumbnail 630 includes at least one of photos, music, video, and files. When the thumbnail 630 is selected and executed, a file 680 associated with the thumbnail 630 may be displayed on the portable device screen 600. When the phone number 640 is selected, Internet telephone may be connected or a map indicative of the position of a building which has the phone number may be displayed on the portable device screen 600. When the URL address link 650 is selected, a web screen may be directly connected and displayed in the portable device screen 600. When the text link 660 is selected, a map, a subway map, or a web screen indicative of the position associated with the text link 660 may be displayed in the portable device screen 600. When the icon 670 indicative of an attached file is selected, the file attached to the message 620 may be displayed in the portable device screen 600. In other words, the file 680 associated with at least one of the thumbnail 630, the phone number, 640, the URL address link 650, and the text link 660 attached to the received message 620 may be displayed in the portable device screen 600 by selecting the at least one.

Figure 7:
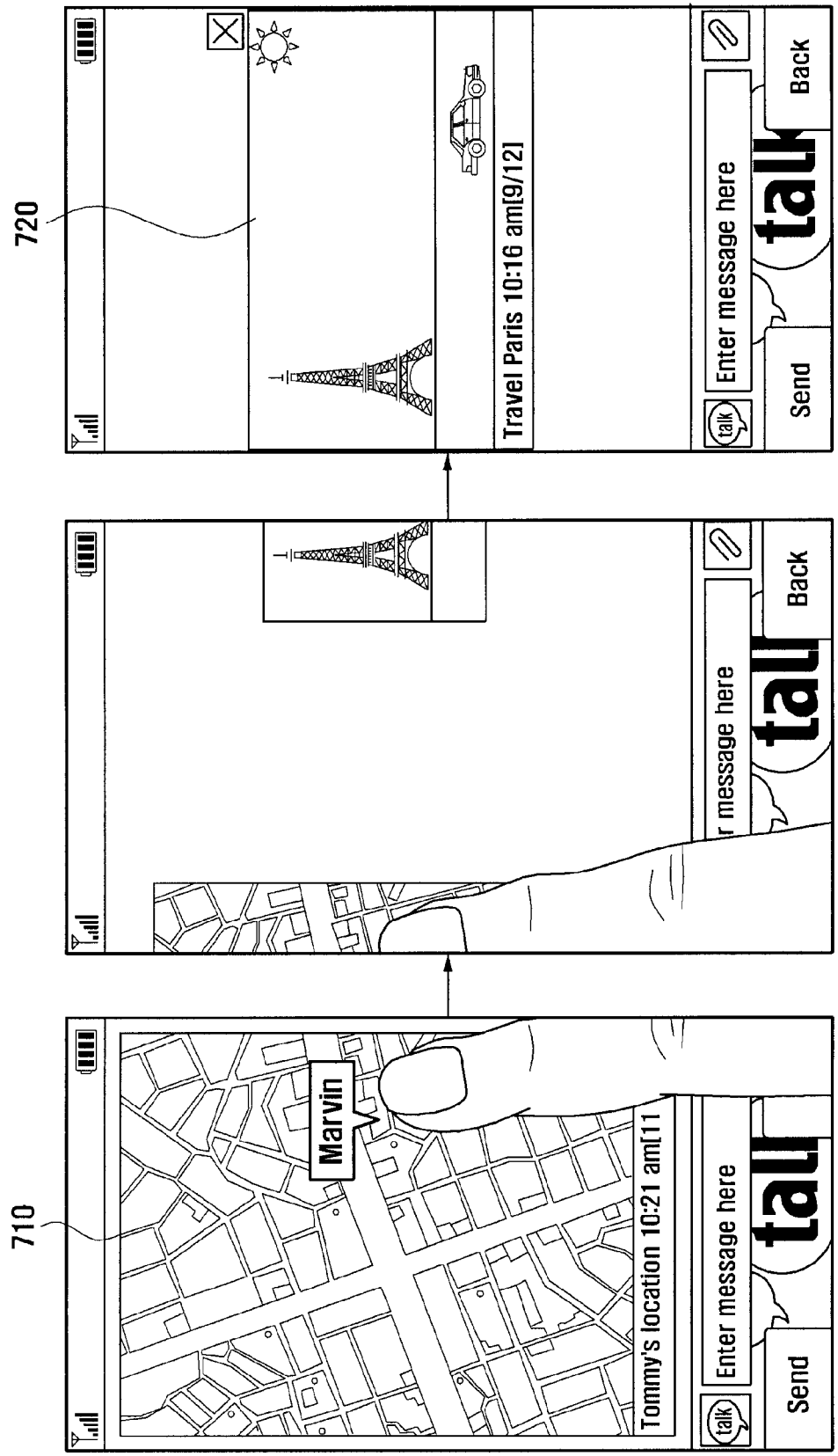
FIG. 7 is a diagram showing an example in which navigation for a file attached to a message is executed according to an exemplary embodiment of the present invention.

FIG. 7 is a diagram showing an example in which navigation for a file attached to a message is executed according to an exemplary embodiment of the present invention. FIG. 7 shows a state in which the file 630, 710 attached to the received message 620 is selected and displayed in the portable device screen 600.

The portable device searches for other received messages associated with the received message 620. If the file 710 attached to the received message 620 is selected, the portable device searches for the file 720 attached to the other received messages. The retrieved file 720 may be displayed in the portable device screen 600 according to a user gesture. For example, other received messages associated with the received message may be searched for, and other retrieved received messages, together with the received message, may be displayed in the message display window.

When the portable device receives a message, it may store information about the sender of the message along with the message. Furthermore, when the portable device sends a message, the portable device may store information about the recipient of the message along with the message. As described above, a message associated with a received message may be searched for using a message and information about the sender of the message or information about the recipient of the message or both. For example, messages associated with the same sender or recipient or both as the sender of a received message may be searched for and stored in the message display window.

In another example, pieces of information regarding that a received message is a response to what previous messages may be stored in the form of a chain, and messages associated with the received message may be searched for on the basis of the pieces of information.

In the state in which the attached file 710 is being displayed in the portable device screen 600, the file 710 may disappear from the portable device screen 600 and a file 720 may be displayed in the portable device screen 600 according to a user gesture. The file 710 and the file 720 are attached to different messages. In other words, in the present embodiment, a user can directly navigate between files attached to messages without navigating to the messages to which the files are attached.

In accordance with an exemplary embodiment of the present invention, a user can navigate not only a file attached to a received message, but also files attached to other messages by selecting the attached file of the received message and then inputting a specific gesture. In other words, in order to navigate a file A2 (the file A2 is attached to a message B) associated with a file A1 attached to a received message A, a user can directly navigate the file A1 to the file A2 without the need to select the message B. That is, files attached to associated messages can be navigated and displayed without navigating and selecting messages (via messages).

The navigation between the attached file 710 of the received message and the attached file 720 of another received message is performed as follows.

The portable device may execute an application for executing the attached file 710 in response to a predetermined screen touch signal. Furthermore, the portable device may execute the attached file 710 of the received message 620 and display the executed file 710 on the portable device screen 600.

The predetermined screen touch signal is generated when a user selects an icon indicating an attached file or when a user performs a gesture for the portable device screen 600. The gesture may be any one of a flick, a drag, a click, a tag, and a touch.

With continued reference to FIG. 7, if the file 710 is displayed in the portable device screen 600 and a gesture is detected on the portable device screen 600 in which the file 710 is displayed, the portable device executes the file 720 attached to another received message using the application and displays the file, attached to another received message, in the portable device screen 600.

The portable device controls the message display window so that a user can navigate between the attached file of the received message and the attached file of another received message through performing a gesture. The user may perform the navigation using the gesture so that the attached file 710 of the received message 620 and the attached file 720 of another received message are alternately displayed in the portable device screen 600. In other words, in the above navigation, when a gesture is detected with the attached file 710 being displayed in the portable device screen 600, the attached file 710 disappears from the portable device screen 600 and the attached file 720 appears in the portable device screen 600.

According to exemplary embodiments of the present invention, in order to compare a difference between the attached files 710 and 720 on the portable device screen 600, the portable device may display the attached files 710 and 720 on one screen. This display of the attached files 719 and 720 on one screen may be controlled by the integrated application driving unit 150.

The received message 620 and another received message may have the same message type or different message types. Furthermore, the attached file 710 of the received message 620 and the attached file 720 of another received message may have the same message type or different message types according to the message types of the received message 620 and another received message.

If another received message is plural, files attached to the other received messages may also be plural. In this case, the sequence that the files are displayed in the portable device screen 600 through the navigation may be based on the time when the other received messages are received.

For example, a file attached to a message received in the first place may appear in the portable device screen 600 in the first place and a file attached to a message later received may finally appear in the portable device screen 600, according to the gesture. Alternatively, the message received most recently may be displayed in the portable device screen 600 in the first place, and an initially received message may be finally displayed in the portable device screen 600. To this end, the portable device may store the time when a message is sent or the time when the message is received or both along with the message when message is sent or when the message is received or both. The portable device may determine the sequence that the attached files are displayed on the basis of the transmission time or the reception time or both.

A menu window, displaying the channel of the received message 620, may be displayed in the portable device screen 600. For example, an icon indicative of the channel may be displayed on the received message 620 or the portable device screen 600 so that the channel of the received message 620 can be known (not shown). For example, if the channel of the received message 620 is "Gmail", the portable device may display an icon, corresponding to "Gmail", in the received message 620. To this end, the portable device may store information about the transmission channel of a message in response to a received message or a transmitted message or both. Furthermore, an icon corresponding to each transmission channel may also be stored in the portable device. The menu window may be any one of an icon, thumbnail, content, a list, and a bar. In this case, information about the icon, the thumbnail, the content, the list, or the bar corresponding to the channel may be stored in the portable device.

The other messages associated with the received message 620 may include at least one of another message belonging to the same user as the received message 620, another message belonging to the same recipient as the received message 620, another message belonging to the same sender as the received message 620, another message within the same directory as the received message 620, and another message within the same folder as the received message 620.

FIG. 8 is a diagram showing an example in which a channel is changed into a channel to which a file can be attached when the file is attached to a message according to an exemplary embodiment of the present invention.

Referring now to FIG. 8, when a message is entered in an input window 810 and an attachment button 820 is selected in order to attach a file to the message, icons 830 of a hidden state, corresponding to a plurality of respective channels, are displayed.

Channels to which the file can be attached, from among the plurality of channels, may be activated and displayed, and channels to which the file cannot be attached, from among the plurality of channels, may be deactivated and displayed.

For example, if the type of the message or the type of the file to be attached is compatible with the types of the plurality of channels, the channels may be activated and displayed. If the type of the message or the type of the file to be attached is incompatible with the types of the plurality of channels, the channels may be deactivated and displayed. For example, when a user writes a message, a channel icon corresponding to a channel through which the message cannot be transmitted may be deactivated and displayed.

A user may select one of the compatible channels, and a channel that has been most used can be automatically selected from among incompatible channels. If the existing selected channel is incompatible with the file, a menu window (not shown) recommending a change into a compatible channel may be executed.

The user may select a specific channel in the menu window.

If the type of the message is compatible with the type of the file although the type of the message is different from the type of the file, the message to which the file has been attached can be sent to another user through the selected channel using the integrated application.

Figure 9:
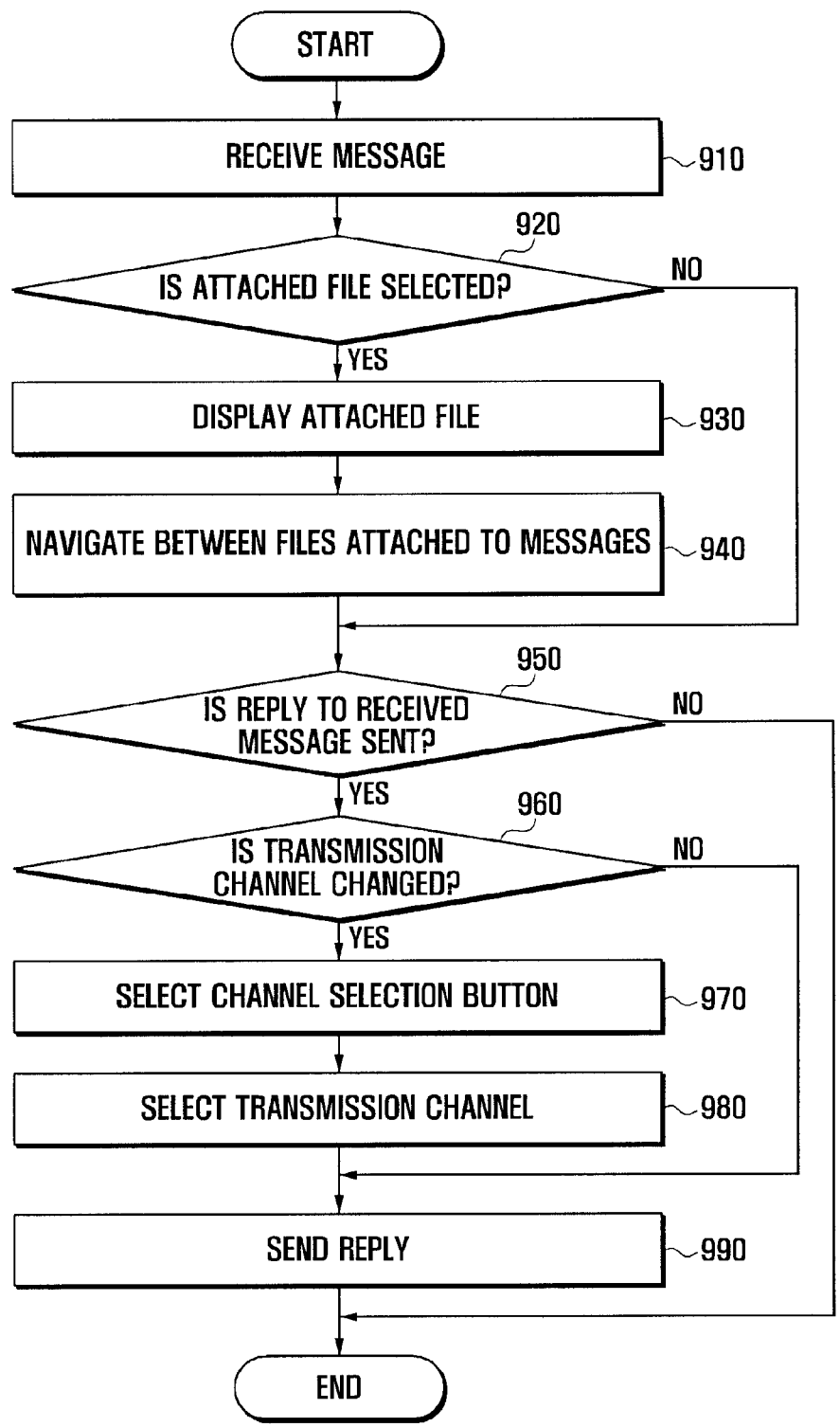
FIG. 9 is a flowchart illustrating the reception and navigation of an attached file using an integrated message according to another embodiment of the present invention.

FIG. 9 is a flowchart illustrating the reception and navigation of an attached file using an integrated message according to another embodiment of the present invention.

At (910), the portable device receives a message. The received message is displayed in the message display window of the portable device. Furthermore, another received message associated with the received message may be searched for, and the retrieved messages, together with the received message, may be displayed in the message display window. When the portable device receives a message, the portable device may store information about the sender of the received message along with the received message. Furthermore, when the portable device sends a message, the portable device may store information about the recipient of the message along with the message. As described above, messages associated with a received message may be searched for using a message and information about the sender of the message or information about the recipient of the message or both. For example, messages belonging to the same sender or recipient or both as the sender of a received message may be searched for and displayed in the message display window. For another example, pieces of information regarding that a received message is a response to what previous messages may be stored in the form of a chain, and messages associated with the received message may be searched for on the basis of the pieces of information.

At (920), the portable device checks whether a user has selected a file attached to the received message. If, as a result of the check, there is no file attached to the received message or the user does not select the file attached to the received message, the process proceeds to step (950).

If, as a result of the check at step (920), the user selects the file attached to the received message, the portable device may display the attached file on the screen of the portable device (930). Step (930) may be omitted according to the exemplary embodiments of the present invention.

If, as a result of the check at step (920), the user selects the file attached to the received message, the portable device may search for files attached to other received messages associated with the received message (940). The process of searching for the files attached to the other received messages may include the process of searching for the files attached to the other received messages having the same message type as the received message and the process of searching for the files attached to the other received messages having a different message type from the received message. The messages having the same message type as the received message may have the same messaging scheme as the received message. In order to implement this process, the portable device may store a message type according to each received message or each transmission message or both. For example, the portable device may search for files attached to other received messages having the same message type as the received message or may search for files attached to the other received messages having a different message type from the received message.

When a gesture is detected in the portable device screen on which the file is displayed, the user searches for another message associated with the received message using the integrated application at step 940. If there is a file attached to the retrieved message, the portable device may display the attached file in the portable device screen 600 so that the user can perform navigation. If there is no file attached to the retrieved message, the user may continue to search for yet another message in order to search for an attached file. The search and retrieval processes are implemented using the integrated application.

The user determines whether to send a reply to the received message (950). If, as a result of the determination at step 950, the user determines not to send a reply to the received message, the integrated message OS is terminated.

If, as a result of the determination at step 950, the user determines to send a reply to the received message, the user may send a reply to the received message using the existing selected channel or may select another transmittable channel and send a reply to the received message.

If a transmission channel through which the reply to the received message is transmitted is not changed (960), the process proceeds to step 990 in which the reply to the received message is transmitted using the existing transmission channel without changing a transmission channel.

However, if a transmission channel through which the reply to the received message is transmitted is changed at step 960, the user selects the channel selection button (970). Next, the user selects the transmission channel through which the reply is sent (980) and sends the reply (990).

A file attached to a received message and files attached to other received messages associated with the received message can be viewed using the integrated application. The attached files can be independently checked because navigation can be performed between the attached files without via the messages. Furthermore, a channel can be easily selected because whether an attached file and a channel are compatible with each other is indicated.

There is disclosed user interface technology in which various types of messages are integrated and displayed in a portable device and a message is written and sent irrespective of the type of a message.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The methods according to the exemplary embodiments of the present invention may also be implemented in the form of program commands which can be executed by various computer means and stored in a computer-readable medium. The computer-readable medium may include program commands, data files, data structures that define structural and functional interrelationships between the data structure and computer software and hardware components that permit the data structure's functionality to be realized solely or in combination. The program commands recorded on the medium may be specially designed and configured for the purpose of the present invention or may be known to a person skilled in the computer software.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined by the appended claims.

What is claimed is:

1. A method comprising:
    displaying, by a display unit of an electronic device, an input window and a message display window, the input window and the message display window being part of an integrated message application that is executed by the electronic device;
    displaying on the message display window, a first message that is entered in the input window;
    responsive to a selection of a channel selection button, displaying a plurality of icons, each icon corresponding to a different one of a plurality of channels; and
    responsive to a first icon from the plurality of icons being selected, sending the first message to a recipient using the first icon's corresponding channel;
    wherein, when the selection of the button is detected, a size of the message display window is reduced.

2. The method of claim 1, further comprising:
    displaying in the message display window a received second message having a different format from the first message; and
    displaying information about a recipient of the second message or information about a sender of the second message.

3. The method of claim 1, further comprising: responsive to the selection of the first icon, modifying the channel selection button to identify the first icon's corresponding channel.

4. A method of receiving an integrated message using a portable device, the method comprising:
    displaying by a display unit a received message in a first display window;
    searching by a controller for other received messages associated with the received message;
    when a file attached to the received message is selected, searching for files attached to said other received messages; and
    displaying the file attached to the received message and the files attached to said other received messages independently of said other received messages;
    wherein the displaying of the file attached to the received message and the files attached to said other received messages includes displaying a second display window comprising the file attached to the received message, receiving an input to the second display window, and displaying one of the files attached to said other received messages in the second display window without the portable device navigating back to the first display window.

5. The method of claim 4, wherein the displaying of the file attached to the received message and the files attached to said other received messages further includes:
    executing by the controller an application for the file attached to the received message;
    executing by the controller the file attached to the received message through the application and displaying the file attached to the received message in the second display window;
    executing by the controller the files attached to the other received messages through the application and displaying the files, attached to the other received messages, in the second display window; and
    controlling the second display window so that a user can navigate between the attached file of the received message and the attached files of the other received messages without returning first to the first display window.

6. The method of claim 5, wherein the files attached to the other received messages are executed when at least one of a flick, a drag, a click, a tag, and a touch is detected.

7. The method of claim 4, wherein searching for the files attached to the other received messages comprises:
    searching for the files attached to said other received messages having an identical message type as the received message; and
    searching for the files attached to said other received messages having a different message type from the received message.

8. The method of claim 4, wherein the files, attached to the other received messages, are displayed in a time order, the method further comprising displaying a menu window for displaying a channel of the received message.

9. The method of claim 8, wherein the menu window comprises at least one of an icon, thumbnail, content, a list, and a bar.

10. The method of claim 4, wherein said other received messages associated with the received message include at least one of: another message belonging to an identical user with the received message, another message belonging to an identical sender with the received message, another message within an identical directory with the received message, and another message within an identical folder with the received message.

11. An apparatus for sending an integrated message using a portable device, the apparatus comprising:
- an integrated message application driving unit that supports a plurality of channels including at least two channels having different messaging schemes;
- a display unit that displays an input window for entering a message and displaying the message entered in the input window, in a display window; and
- a controller that receives a user choice for displaying icons having a hidden status, each of the icons corresponding to a different one of the plurality of channels, displaying the icons in response to the user choice, and sending the message through an least one activated channel of the plurality of channels;
- wherein the controller controls a reduction of a size of the display window, when the user choice for displaying the icons is received.

12. The apparatus of claim 11, wherein the controller checks a size and type of the message entered in the input window, detects a channel of a messaging scheme compatible with the size and type of the message, activates the detected channel, and sends the message using the detected channel to a recipient.

* * * * *